(No Model.)
T. J. MAYALL, Dec'd.
L. A. Mayall, Executrix.
FRICTION ROLLER FOR CABLE GRIPS AND OTHER PURPOSES.
No. 381,404. Patented Apr. 17, 1888.
FIG_I_
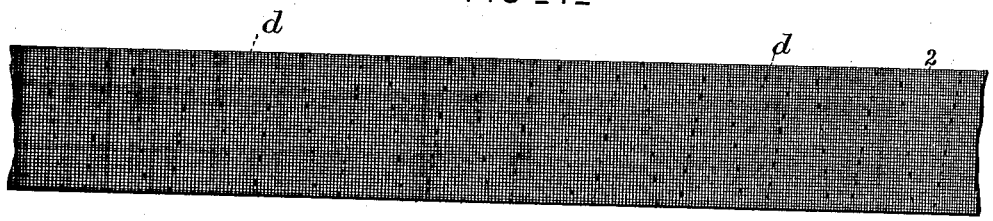
FIG_II_
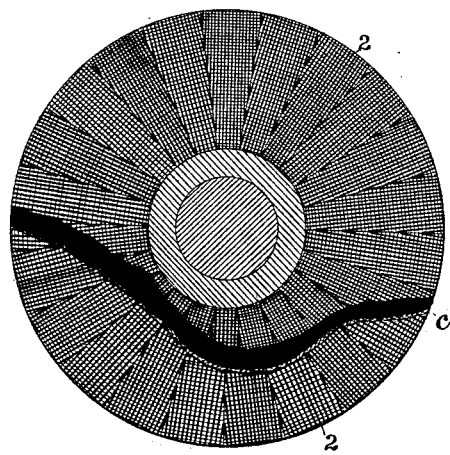
FIG_III_
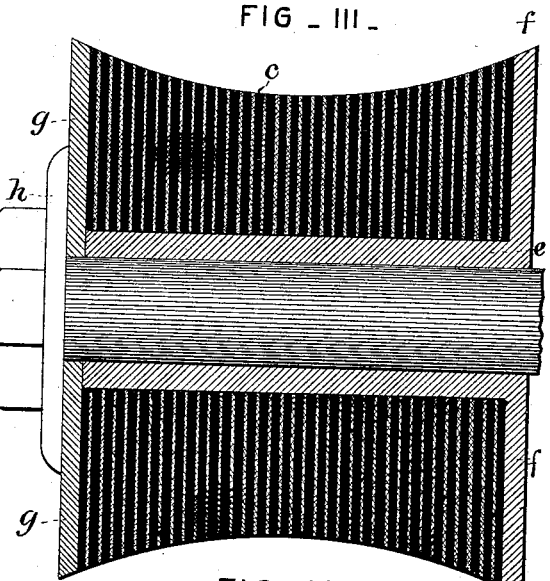
FIG_IV_
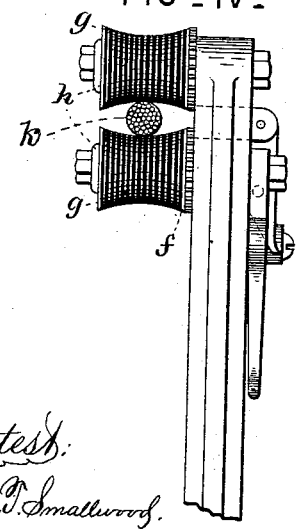
FIG_V_
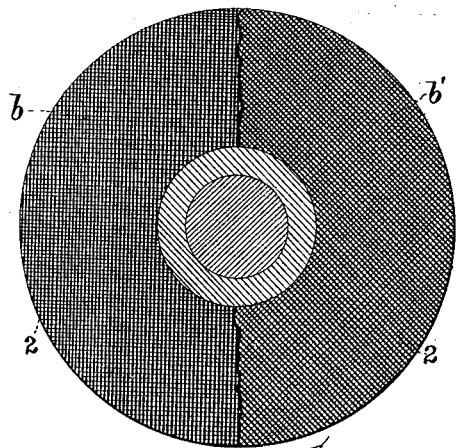
Attest:
Geo. T. Smallwood.
Philip Mauro
Inventor:
Thos. J. Mayall.

UNITED STATES PATENT OFFICE.

THOMAS J. MAYALL, OF READING, MASSACHUSETTS; LUCY A. MAYALL EXECUTRIX OF SAID THOMAS J. MAYALL, DECEASED.

FRICTION-ROLLER FOR CABLE-GRIPS AND OTHER PURPOSES.

SPECIFICATION forming part of Letters Patent No. 381,404, dated April 17, 1888.

Application filed June 16, 1887. Serial No. 241,511. (No model.)

*To all whom it may concern:*

Be it known that I, THOMAS J. MAYALL, of Reading, in the county of Middlesex and State of Massachusetts, have invented a new and useful Improvement in Friction-Rollers for Cable-Grips and other Purposes, which improvement is fully set forth in the following specification.

This invention relates to the construction of rubber friction-rollers, particularly for use in grips for cable railways, such as described in my application filed June 21, 1887, No. 242,036, though the roller may be used for other purposes.

According to my invention the roller is built up of successive layers of canvas, duck, or other suitable fabric and rubber, the whole being vulcanized into a solid mass. The layers of cloth are placed transversely to the axis of the roll, so that the edge of each layer comes to the surface of the roller. The object of this construction is to increase the durability of the roller and also to enable it to take a firmer hold of the cable. If the roller were constructed as common in the manufacture of rubber hose—for example, with the layers of cloth and rubber forming successive cylinders—the surface of the cloth instead of its edge would be exposed to wear and would be quickly worn through.

The objects above specified are further subserved by so disposing the successive layers of cloth as to present at all points on the surface of the roller the ends of the cut threads, so that the wear upon them is directly in line with their length. This may be practically accomplished by laying the pieces of fabric in such way that the warp-threads of the successive layers run in different directions, the threads of one layer making an angle of, say, forty-five degrees with those of the next above and below. I prefer, however, to cut the cloth into gores or sectors in which the warp-threads all run in the same direction, and then lay these sectors together to form a disk. The warp-threads then will all be radial to the axis of the roller. The layers in this case should be so disposed as to break joints. When the roller is built up to the proper size, it is applied to a suitable base—say a metal tube—and vulcanized in place. The mass could of course be first vulcanized and the roller cut therefrom.

The invention will now be described more in detail, in connection with the accompanying drawings, in which—

Figure I is a diagram showing how the rubber-coated cloth may be cut; Fig. II, a plan view showing one layer partly broken away to show the layer below; Fig. III, a longitudinal section of the roller; Fig. IV, an elevation of the grip mechanism; and Fig. V, a view similar to Fig. II, showing a roller in which the cloth is cut in the form of disks.

As shown more clearly in Fig. III, the roller $a$ is composed of successive layers of rubber and canvas or other fabric coated with rubber, the layers being disposed at right angles to the surface of the roller instead of parallel therewith. The canvas or other fabric is treated with rubber by means of a friction-machine, in the well-known way, and a coating of any suitable thickness is applied thereto. When so treated, it is cut into the proper shape.

As shown in Fig. V, the cloth is cut in the form of disks $b\ b'$, and these disks are laid one on top of the other, with a layer of rubber, $c$, between. As each disk is put in place, it is turned about one-quarter with respect to the adjacent disk. Thus, as shown in Fig. V, the warp-threads 2 of the upper disk, $b$, make an angle of about forty-five degrees with those of the disk $b'$. By this arrangement the radial threads, or those which present their ends to the surface of the roller, are distributed with practical uniformity over the entire surface. It is preferable to have the warp-threads all run radially, or approximately so, to the axis of the roller; and to this end the cloth may be cut into sector-shaped pieces $d$, as shown in Fig. I, the warp-threads 2 of each piece all running in the same direction. The sectors $d$ are then placed together in such manner as to form a disk, as shown in Fig. II, so that the warp-threads are all radial to the disk, or approximately so. The next layer of fabric should be so disposed as to break joints with the one beneath. This method has the further advantage of economizing the rubber-coated cloth, as the sectors $d$ can be cut with little wastage, as clearly shown in Fig. I.

The mass of rubber and cloth, when built up to the desired thickness, is placed on a metal tube, e, provided with a flange, f. A washer, g, is then placed on the other end and clamped by a nut to form a roller, h. The mass can then be vulcanized in place; or, instead of cutting the pieces of cloth the size and shape of the roller, a large mass of rubber and cloth could be formed and vulcanized and the roller afterward cut therefrom. The traction-cable k is indicated in Fig. IV, which also shows a gripper—such, for example, as described in my application aforesaid.

The invention is not limited to rollers, but may obviously be applied to any form of gripper or like mechanism in which it would be equally advantageous to have the layers of rubber and canvas transverse to instead of parallel with the gripping-surface.

Having now fully described my said invention, what I claim, and desire to secure by Letters Patent, is—

1. A roller or a gripping device composed of alternate layers of rubber and cloth disposed transversely to the gripping-surface, substantially as described.

2. A roller composed of alternate layers of rubber and cloth arranged transversely to the axis of the roller, the layers of cloth being so disposed that the ends of the cut threads come to the surface, substantially as described.

3. In a gripper, a roller composed of successive layers of cloth and rubber arranged transversely to the axis of the roller, the layers of cloth being composed of sectors in which the warp-threads all run radially, substantially as described.

In testimony whereof I have signed this specification in the presence of two subscribing witnesses.

THOS. J. MAYALL.

Witnesses:
PHILIP MAURO,
C. J. HEDRICK.